United States Patent
Roberts et al.

(10) Patent No.: US 9,934,148 B2
(45) Date of Patent: Apr. 3, 2018

(54) MEMORY MODULE WITH EMBEDDED ACCESS METADATA

(71) Applicant: Advanced Micro Devices, Inc., Sunnyvale, CA (US)

(72) Inventors: David A. Roberts, Santa Cruz, CA (US); Sergey Blagodurov, Bellevue, WA (US)

(73) Assignee: Advanced Micro Devices, Inc., Santa Clara, CA (US)

( * ) Notice: Subject to any disclaimer, the term of this patent is extended or adjusted under 35 U.S.C. 154(b) by 129 days.

(21) Appl. No.: 14/747,967

(22) Filed: Jun. 23, 2015

(65) Prior Publication Data

US 2016/0378668 A1 Dec. 29, 2016

(51) Int. Cl.
*G06F 12/10* (2016.01)
*G06F 12/0862* (2016.01)

(52) U.S. Cl.
CPC .. *G06F 12/0862* (2013.01); *G06F 2212/6024* (2013.01)

(58) Field of Classification Search
CPC .................. G06F 12/0862; G06F 2212/6024
USPC ...................................................... 711/137
See application file for complete search history.

(56) References Cited

U.S. PATENT DOCUMENTS

| | | | | |
|---|---|---|---|---|
| 2002/0144062 A1* | 10/2002 | Nakamura | .......... | G06F 9/30043 711/137 |
| 2003/0079088 A1* | 4/2003 | Malik | ................. | G06F 12/0862 711/137 |

OTHER PUBLICATIONS

Luiz E. Ramos, Eugene Gorbatov, and Ricardo Bianchini, "Page Placement in Hybrid Memory Systems", Proceedings of the International Conference on Supercomputing, Jun. 2011, pp. 85-95.
Stephen Somogyi, Thomas F. Wenisch, Anastasia Ailamaki, and Babak Falsafi, "Spatio-Temporal Memory Streaming", Proceedings of the International Symposium on Computer Architecture Jun. 2009, pp. 1-12.
G. Loh et al., "Efficiently Enabling Conventional Block Sizes for Very Large Die-stacked DRAM Caches," MIRCO 11, Dec. 2011, 11 pages.
P. Nair, D. Roberts, M. Qureshi, "Citadel: Efficiently Protecting Stacked Memory from Large Granularity Failures," MICRO'14, 2014, 7 pages.
Doe Hyun Yoon and Mattan Erez "Virtualized and Flexible ECC for Main Memory" Proceedings of The Fifteenth Edition of ASPLOS on Architectural Support for Programming Languages and Operating Systems.(ASPLOS XV), Mar. 2010, pp. 397-408.
Wikipedia, https://en.wikipedia.org/wiki/Redundant_array_of_independent_memory, accessed Dec. 1, 2015.

* cited by examiner

*Primary Examiner* — Jae Yu (57) ABSTRACT

A memory module stores memory access metadata reflecting information about memory accesses to the memory module. The memory access metadata can indicate the number of times a particular unit of data (e.g., a row of data, a unit of data corresponding to a cache line, and the like) has been read, written, had one or more of its bits flipped, and the like. Modifications to the embedded access metadata can be made by a control module at the memory module itself, thereby reducing overhead at a processor core. In addition, the control module can be configured to record different access metadata for different memory locations of the memory module.

14 Claims, 5 Drawing Sheets

MEMORY MODULE WITH EMBEDDED ACCESS METADATA

BACKGROUND

Field of the Disclosure

The present disclosure relates generally to processors and more particularly to memory modules for processors.

Description of the Related Art

To improve efficiency, a processor typically employs some form of memory management, whereby the processor transfers data between memory modules based on the expected needs of program threads executing at the processor. For example, a processor may employ a memory hierarchy, wherein some memory modules that store a relatively small amount of data can be accessed more efficiently by a processor core than other memory modules that store a larger amount of data. An operating system (OS) executing at the processor transfers data between the memory modules, so that blocks or pages of data expected to be accessed by a thread executing at the processor core are moved to the memory modules that can be accessed more efficiently and pages of data that are less likely to be accessed are moved to the memory modules that can be accessed less efficiently. To assist in identifying which pages are more or less likely to be accessed, the OS can store information about memory accesses to each page at page tables associated with the pages of data. However, the page tables represent large, coarse-grained blocks and typically have only a small amount of space available to store such access information, limiting the effectiveness of memory management by the OS.

BRIEF DESCRIPTION OF THE DRAWINGS

The present disclosure may be better understood, and its numerous features and advantages made apparent to those skilled in the art by referencing the accompanying drawings. The use of the same reference symbols in different drawings indicates similar or identical items.

DETAILED DESCRIPTION

FIGS. 1-7 illustrate techniques for embedding information about memory accesses to a memory module at the memory module itself. The information, referred to herein as "access metadata," can indicate the number of times a particular unit of data (e.g., a row of data, a unit of data corresponding to a cache line, and the like) has been read, written, had one or more of its bits flipped, and the like. Modifications to the embedded access metadata can be made by a control module at the memory module itself, thereby reducing overhead at a processor core. Modifications can also be made by an external memory controller. In addition, the control module can be configured to record different access metadata for different memory locations of the memory module. The memory module can therefore provide more detailed (fine-grained) and more flexible access information than can be recorded at an OS page table, allowing for more effective memory management at the processor.

In some embodiments, the access metadata can include prefetch stream information for the corresponding memory location of the memory module. The prefetch stream information indicates data that is to be prefetched in response to a demand access to the memory location, and can be updated based on observed memory access patterns to improve prefetch effectiveness. By storing the prefetch stream information for each memory location, more complex prefetch patterns can be identified and implemented, improving processing efficiency.

Figure 1:
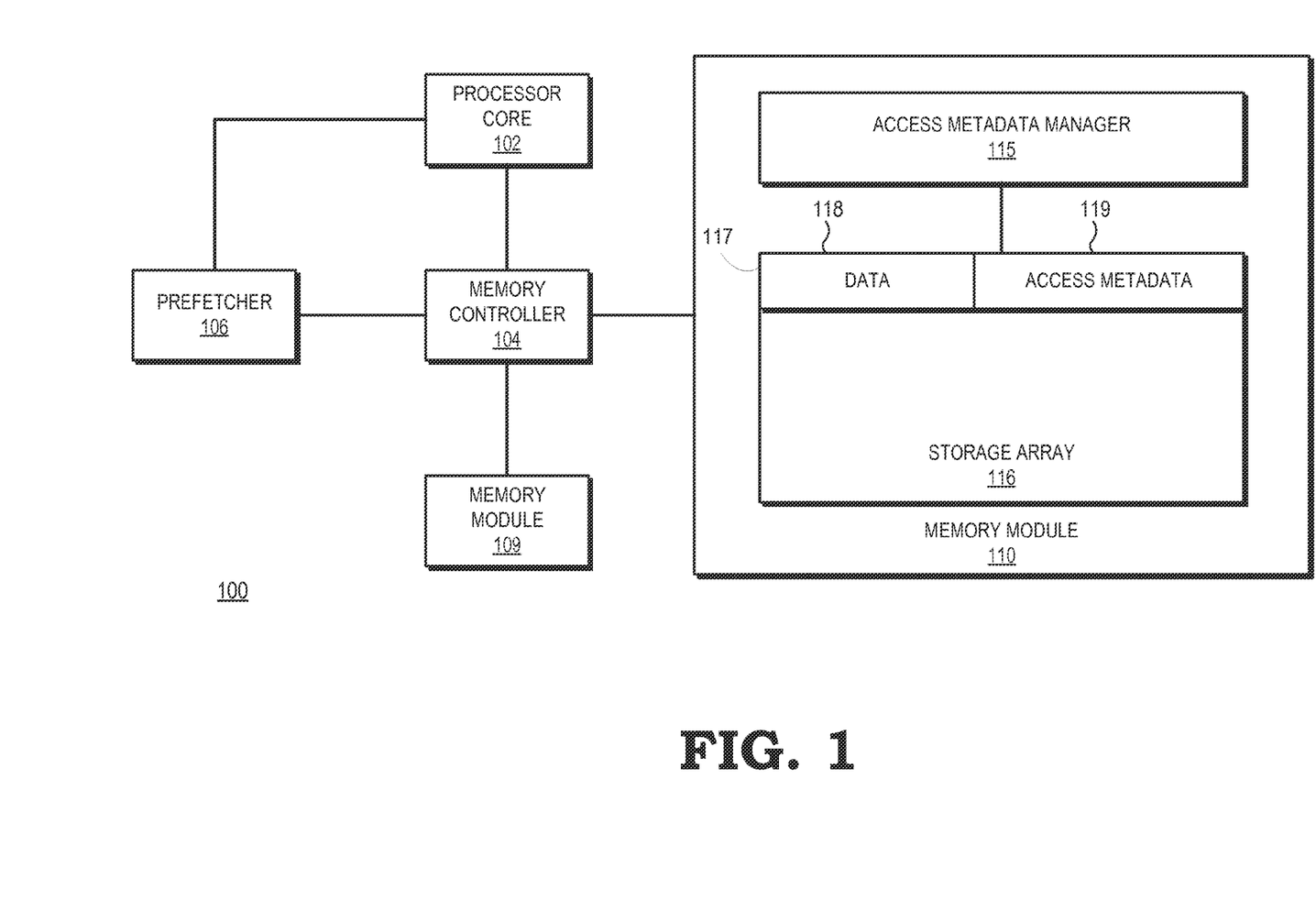
FIG. 1 is a block diagram of a processor employing a memory module with embedded access metadata indicating statistical information about accesses to the memory module in accordance with some embodiments.

FIG. 1 illustrates a processor 100 that employs a memory module 110 to store access metadata in accordance with some embodiments. The processor 100 is a general-purpose or application specific processor configured to execute sets of instructions organized as computer programs, in order to perform tasks on behalf of an electronic device. Examples of electronic devices that incorporate the processor 100 include a personal computer (e.g., a desktop computer or laptop), a server, a tablet, a compute-enabled phone, a compute-enabled wristwatch, a game console, and the like.

To facilitate execution of computer programs, the processor 100 includes one or more processor cores (e.g., processor core 102) configured to execute sequences of computer program instructions, the sequences referred to herein as program threads or, more simply, threads. In some embodiments, the processor 100 can include multiple processor cores, with individual processor cores able to concurrently execute threads for the same or different computer programs. In further embodiments, one or more of the processor cores of the processor 100 can be central processing units (CPUs). Further, one or more of the processor cores or other hardware of the processor 100 can be specially configured to executed threads and other operations associated with particular types of tasks. For example, the processor 100 can include one or more graphics processing units (GPUs) to execute operations associated with graphics and video processing.

In the course of executing program threads and associated operations, the processor cores of the processor 100 can manipulate data stored at memory modules, such as memory modules 109 and 110. In particular, based on particular instructions, the processor cores can generate operations, referred to as memory accesses, to store and retrieve data at the memory modules. For purposes of description of FIG. 1, memory accesses can fall into either of two general types: read accesses to retrieve data from a memory module and write accesses to store data at a memory module. Each memory access is generated to include a memory address indicating a memory location targeted by the memory access.

To facilitate execution of memory accesses, the processor 100 includes a memory controller 104. The memory controller 104 receives memory accesses from the processor cores, buffers the accesses, generates signaling to provide each memory access to the memory module targeted by the access, receives responses to read accesses, buffers the responses, and provides each response to the processor core targeted by the response. The memory controller 104 can also perform other functions to manage the execution of memory accesses, including error detection and correction and the like. In variations, the memory controller 104 is incorporated in a common integrated circuit package with the processor cores and/or other modules of the processor 100. For example, the memory controller 104 can be on a common semiconductor die as the processor cores. In some embodiments, the memory controller 104 can be located in a separate semiconductor package from the processor cores and connected to the cores via a printed circuit board or other connecting device.

The memory modules 109 and 110 are configured to execute memory accesses received from the memory controller 104. To wit, the memory modules 109 and 110 include storage arrays (e.g., storage array 116 shown for memory module 110) composed of memory locations, with each memory location associated with a corresponding unique memory address. Each memory access generated by a processor core includes information indicating the memory address targeted by the memory access. In response to a read access, the corresponding memory module retrieves the data stored at the memory location targeted by the memory access and provides the data to the memory controller 104. In response to a write access, the corresponding memory module stores the data payload of the write access at the memory location targeted by the access.

In some embodiments, the memory modules 109 and 110 are incorporated in a common integrated circuit package with the processor cores and other modules of the processor 100. For example, one or more of the memory modules 109 and 110 can be on a common semiconductor die as the processor cores. In some embodiments, one or more of the memory modules 109 and 110 are on separate semiconductor dies from the processor cores, with the dies of the cores and the memory modules arranged in a stacked die or other 3-dimensional (3D) integrated circuit arrangement. In some embodiments, one or more of the memory modules 109 and 110 can be located in a separate semiconductor package from the processor cores and connected to the cores via a printed circuit board or other connecting device. In some embodiments, one or more of the memory modules 109 and 110 can include non-volatile memory that retains data after being powered down, but that may wear out over time.

In some embodiments, different memory modules and other storage devices associated with the processor 100 respond to memory accesses at different rates. For example, the memory module 109 may have a larger storage capacity than the memory module 110, but the memory module 110 can respond to memory accesses more efficiently than the memory module 109. Further, in some embodiments different memory modules can respond more quickly to particular processor cores. For example, a CPU of the processor 100 can access the memory module 109 more efficiently that the memory module 110, while a GPU of the processor 100 can access the memory module 110 more efficiently. To enhance memory access efficiency, the processor 100 can implement a memory management scheme, wherein data is transferred between memory modules and other memory devices associated with the processor 100 in order to place data in the memory module or device where it can be accessed efficiently. The memory management scheme can be implemented by a dedicated hardware module, by software executing at the processor 100, and the like, or by a combination thereof. For purposes of description, it is assumed that memory management is performed at the processor 100 by an OS. However, it will be appreciated that the OS can work with other software and hardware modules to apply the memory management scheme.

To enhance the efficacy of memory management, it is useful for the OS to identify patterns in memory accesses generated at the processor 100. This allows the OS to make better decisions as to which data to place at a particular memory module at a particular time, as well as which data to evict from a given memory module when new data is to be moved in to the memory module, the OS tracks statistical information about how individual sets of data have been accessed at the memory modules. This statistical information is referred to herein as access metadata. As described further herein, at least a portion of the access metadata for a given set of data is tracked and maintained at the memory module that stores the given set. Because of the large amount of space available at the memory modules relative to other vehicles for storing access metadata (e.g., OS page tables), a relatively large amount of metadata can be stored, allowing the OS to better identify patterns in memory accesses and therefore make better memory management decisions.

In the illustrated example of FIG. 1, the memory module 110 includes a storage array 116 to store both data on behalf of programs executing at the processor 100 (referred to herein as "payload data") and access metadata. In particular, the storage array 116 includes a number of rows, such as row 117. Each row includes a data section (e.g., payload data section 118 of row 117) to store payload data and an access metadata section (e.g., access metadata section 119) to store access metadata for the corresponding payload data. Thus, for example, the access metadata section 119 stores access metadata indicating statistical information about data accesses to the payload data section 118. Examples of the access metadata include the number of read accesses to the corresponding data payload, the number of write access to the data payload, the number of times individual bits of the data payload have been flipped, average read latency for the data payload, average write latency for the data payload, and the like. In some embodiments, the access metadata for each data payload is not stored at the same row as the data payload, but in a different, dedicated portion of the storage array.

To facilitate tracking and storage of the access metadata, the memory module 110 includes an access metadata manager (ADM) 115. The ADM 115 is a control module, such as a field programmable gate array (FPGA) or other hardware module that is generally configured to modify access metadata at the storage array 116 in response to received memory accesses and based on modification rules for the access metadata. In some embodiments the ADM 115 can perform arithmetic and logical operations, including addition, subtraction, multiplication, AND operations, OR operations, and the like, and combinations thereof in order to implement each access metadata modification rule. Thus, for example, the access metadata section 119 for the payload data section 118 can include a field to record the number of read accesses to the data payload. In response to receiving a read access to the payload data section 118, the ADM 115 can read the access metadata section 119, perform arithmetic and logical operations to increment the number of read accesses at the corresponding field of the access metadata section 119, and store the adjusted access metadata at the row 117. In some embodiments, the ADM 115 is located at the memory controller 104. Because adjustments to metadata are made by the ADM 115 at the memory module 110 or memory controller 104, memory management overhead at the processor cores of the processor 100 is reduced.

In some embodiments, the rules implemented by the ADM 115 are programmable or otherwise modifiable by the processor cores of the processor 100. This allows the OS or other software or hardware of the processor 100 to set different individual rules for the access metadata for each row or data block of the storage array 116. Thus, for example, the ADM 115 can be programmed to record only the number of read accesses to a given row of the storage array 116, and to record only the number of write accesses to a different row of the storage array 116. The ADM 115 can also be programmed to adjust the access metadata for different rows according to different adjustment factors or formulas in order to implement a particular memory management scheme.

In some embodiments, as explained further below with respect to FIGS. 5-7 the access metadata for a row can include prefetch stream information to assist the processor 100 in performing prefetch operations. To illustrate, the processor 100 includes a prefetcher 106 generally configured to monitor memory accesses received at the memory controller 104, identify patterns in those accesses, and prefetch data to a cache (not shown) or other memory module of the processor 100 based on the identified patterns. For each memory access to a given row of the storage array 116, the ADM 115 can record at the access metadata a pointer to one or more rows or data blocks targeted by subsequent memory accesses. The pointers indicate a prefetch stream of locations to be prefetched in response to a demand request for the given row. Thus, in response to a demand request to a row of the storage array 116, the prefetcher 106 can identify the prefetch stream stored at the corresponding metadata, and prefetch the data indicated by the pointers of the prefetch stream. This allows the processor 100 to prefetch data based on relatively complex memory access patterns, including patterns that are difficult to detect with conventional stride prefetching techniques.

The relatively large amount of space available to store access metadata at the memory module 110 relative to, for example, an OS page table allows the OS or other software to implement relatively sophisticated memory management schemes, thereby improving processor efficiency. For example, in some embodiments the access metadata can be stored and tracked with one or more thread identifiers, so that the access metadata for a data payload indicates a number of accesses by each of a plurality of threads. This allows the OS to make memory management decisions on a per-thread basis (for example, transferring a particular block of data to different memory modules for different threads), thereby improving processor efficiency. In some embodiments, the granularity of the access metadata on, for example, a per cache line basis allows the OS to identify more complex memory address patterns indicated by data accesses than can be indicated by page table access information, thereby allowing the OS to make better memory management decisions. Further, the large amount of access metadata enables the OS to perform sophisticated statistical analyses of the access metadata including, for example, regression analyses, time series analyses, and the like.

In some embodiments, the OS can reset stored access metadata in response to any of a number of criteria, such as termination of a thread, a program, or other event. In some embodiments, the OS or other software can implement task trackers for particular sets of instructions to be executed at the processor, with the memory access metadata being reset at the end of each set. This allows the OS to identify memory access patterns for selected sets of instructions to be executed.

Figure 2:
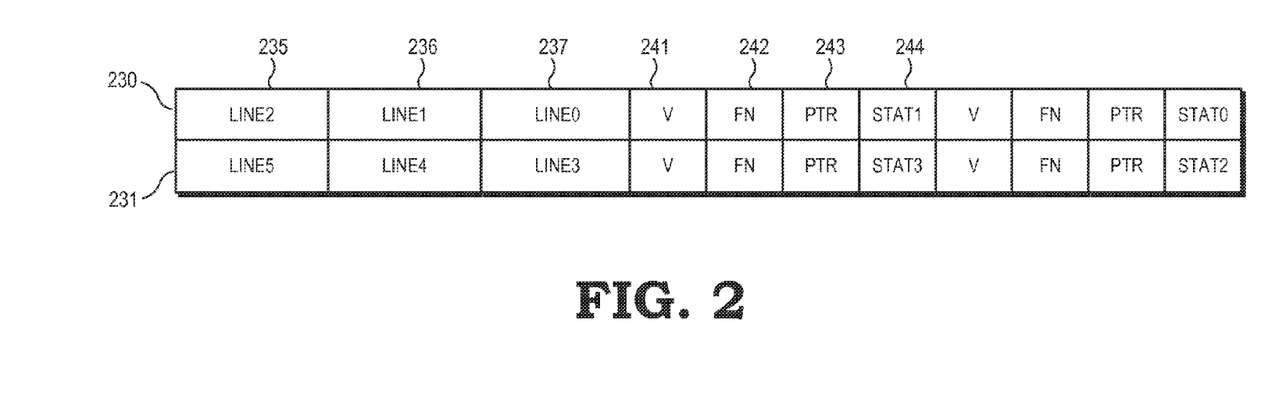
FIG. 2 is a block diagram of embedded access metadata stored at the memory module of FIG. 1 in accordance with some embodiments.

FIG. 2 illustrates a block diagram of rows 230 and 231 corresponding to rows of the storage array 116 of FIG. 1 in accordance with some embodiments. Each of the rows 230 and 231 include data payload fields (e.g., data payload fields 235, 236, and 237 of row 230). Each data payload field of a row stores payload data of a corresponding unit size. In some embodiments, the unit size corresponds to the size of a cache line for a cache of processor 100. In some embodiments, the unit size is the smallest amount of data that the memory module 110 can provide or store in response to a memory access.

Each of the rows 230 and 231 also includes access metadata fields including at least a validity field (e.g., validity field 241 of row 230), a function (FN) field (e.g., FN field 242 of row 230), a pointer field (e.g. pointer field 243 of row 230), and a statistic field (e.g., statistic field 244 of row 230). In the illustrated example, each row includes multiple instances of these fields to allow for recording of different types of access metadata for the corresponding row. For example, in some embodiments each row includes 2 kilobytes for storing data, with 32 different data payload fields, each corresponding to a 64 byte cache line. Each row can further include a set of metadata fields for each of the 32 different payload fields, or can include a lower number of metadata field sets, with each metadata field set having a pointer indicating for which data payload field they store access metadata.

In some embodiments, the data payload fields and access metadata fields of a row are separately addressable, so that they can be accessed separately. For example, the physical address for the data payload fields and the access metadata fields can have similar physical addresses, differing only by their most significant bit (MSB). This allows the OS or other software to quickly access both a data payload field and corresponding metadata by changing only the MSB of the physical address for the memory access.

The validity field 241 stores data indicating whether the corresponding statistic field stores valid data. Accordingly, the validity field 241 can be used by the ADM 115, the OS, or other software or hardware to perform cleanup and other overhead operations for the access metadata. The FN field 242 indicates whether the corresponding statistic field is to be updated for every access to the corresponding row, or only on accesses to selected ones of the data payload fields for the row, as well as what kind of function is applied to modify the statistic field on a payload field access. For example, the FN field 242 can indicate a given metadata value is to be incremented on read and write accesses, and is to be decremented on reset operations. As another example, the FN field 242 for the row 230 can indicate that the statistic field 244 is only to be updated in response to accesses to the data payload fields 235 and 237, and is not to be updated in response to accesses to the data payload field 236. The pointer field 243 stores one or more pointers indicating which of the data payload fields will trigger a modification to the corresponding statistic field 244. The statistic field 244 stores the current value of the memory access metadata.

Figure 3:
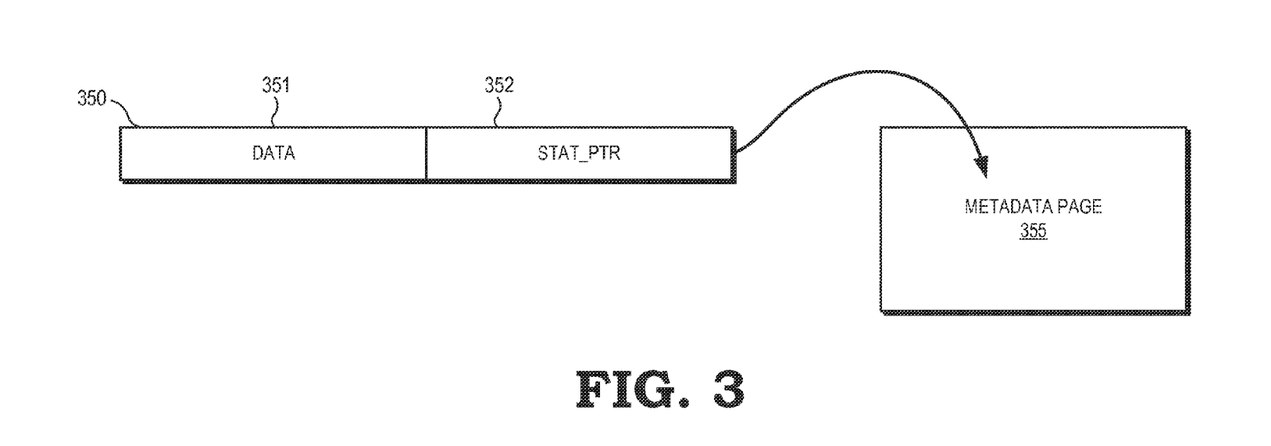
FIG. 3 is a block diagram illustrating a memory access at the memory module of FIG. 1 providing a pointer to embedded access metadata in accordance with some embodiments.

FIG. 3 illustrates modification of access metadata at the memory module 110 in accordance with some embodiments wherein the access metadata is not stored at each row of the storage array 116, but instead is stored at dedicated metadata pages located at the storage array 116. The depicted example illustrates a memory access request 350 including a data payload field 351 and a metadata pointer field 352. The data payload field includes payload data for the memory access request, if any (e.g., write data for a write access request). The metadata pointer field 352 stores a pointer to the memory address at a metadata page 355. In response to receiving the memory access request 350, the ADM 115 modifies the access metadata at the memory location indicated by the metadata pointer field 352. In some embodiments, the pointer of the metadata pointer field 352 can reside either with the data in memory, or in a system page table entry. In the case of a page table entry, it is the responsibility of the processor address translation and TLB logic to provide the ADM 115 with the requested memory address of the data in addition to the address of the metadata page 355.

By using metadata pages and metadata pointer fields, rather than storing the metadata for a row at the corresponding row, the processor can implement more flexible metadata tracking and analysis and thereby support more complex memory management schemes. In some embodiments, each memory access request can include multiple pointers, with each pointer pointing to a different set of metadata to be modified in response to the request. In some embodiments, each memory access request can indicate a pointer range, with each memory location in the range storing metadata to be modified in response to the request. Further, the pointers to metadata can be stored in entries of a translation lookaside buffer (TLB) to allow for efficient access to the pointers.

Figure 4:
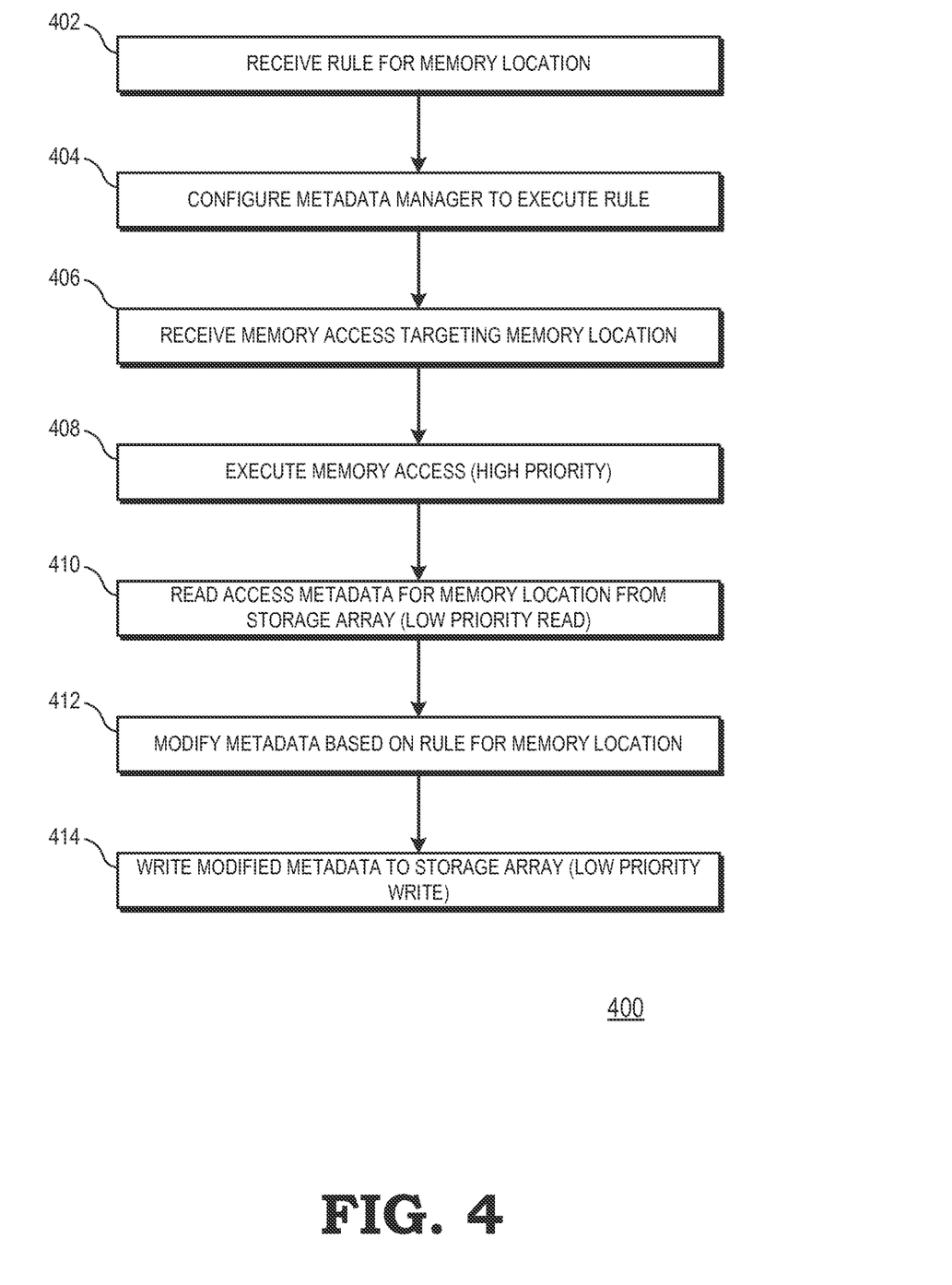
FIG. 4 is a flow diagram of a method of modifying memory access metadata stored at a memory module in accordance with some embodiments.

FIG. 4 illustrates a block diagram of a method 400 of storing and maintaining access metadata at the memory module 110 in accordance with some embodiments. At block 402 the memory module 110 receives from the processor core 102 an access metadata rule for a memory location (e.g., a row of the storage array 116), indicating how the access metadata for the memory location is to be modified in response to a memory access request. For example, the access metadata rule can indicate the types of memory access requests that will result in the memory location being modified, the formulas used to adjust the values of the memory access metadata, and the like. At block 404, the ADM 115 is configured to implement the received access metadata rule. That is, the ADM 115 connects its gates, storage elements, microcode instructions and other circuitry to set one or more circuit paths so that it can implement the received access metadata rule.

At block 406 the memory module 110 receives a memory access request targeting the memory location. In response, at block 408 the memory module 110 executes the memory access request by, for example, writing data to or reading data from the data payload fields of the memory location. In some embodiments, the memory module 110 is able to assign different priorities to different operations such as execution of memory access requests and modification of access metadata. The memory module 110 assigns a relatively high priority to executing memory access requests and a relatively low priority to modification of access metadata, as described further below. This ensures that the modification of the access metadata does not significantly impact the responsiveness of the memory module 110 to memory access requests.

At block 410 the ADM 115 initiates modification of the access metadata at the memory location by executing a low priority read of the access metadata fields at the memory location. At block 412 the ADM 115 modifies the values read at block 410 based on the rule for the memory location received at block 402, or as indicated by the FN field for the accessed row. At block 414 the ADM 115 executes a low priority write to store the modified values at the access metadata fields of the memory location, thereby completing modification of the access metadata.

Figure 5:
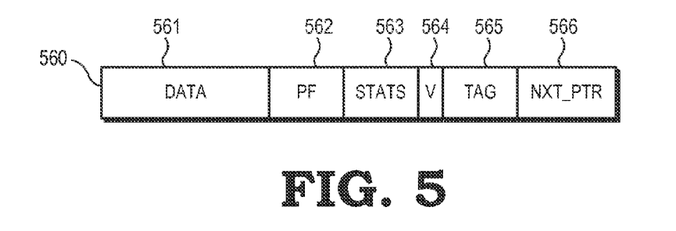
FIG. 5 is a block diagram of embedded access metadata including prefetch stream data in accordance with some embodiments.

FIG. 5 illustrates a block diagram of a row 560 of the storage array 116 of FIG. 1 in accordance with some embodiments, wherein the row 560 includes prefetch stream fields to assist the prefetcher 106. In particular, the row 560 includes a data payload field 561, a prefetch flag field 562, a statistics field 563, a valid bit 564, a tag field 565, and a next pointer field 566. The data payload field 561 stores the data payload for the row. The prefetch flag field 562 indicates whether the data payload was the target of a prefetch request. The statistics field 563 can be used to store prefetch statistics for the row, such as the number of prefetch hits associated with the row. That is, the number of times the data payload of the row was prefetched to a cache of the processor 100 and subsequently accessed at the row.

The valid bit 564 indicates whether the tag field 565 and next pointer field 566 store valid prefetch information. The tag field 565 stores a tag value that, when matched by a received memory access request, causes the prefetcher 106 to issue a prefetch request for the address stored at the next pointer field 566. The valid bit 564, tag field 565, and next pointer field 566 are collectively referred to as a set of prefetch fields. For simplicity, the row 560 is illustrated as having only one set of prefetch fields. It will be appreciated that, in some embodiments, the row 560 can have multiple sets of prefetch fields, with each set having a different tag value, different next pointer value, or both. The tag value stored at the tag field 565 can be an object tag, an instruction pointer value, a thread identifier, an address tag, and the like, or any combination thereof.

In operation, in response to receiving a memory access request targeted to the row 560, the memory module 110 determines whether an address or other field of the request, or a portion thereof, matches a tag value in the set of prefetch fields. For each matching tag value, the memory module 110 provides the corresponding next pointer value to the prefetcher 106. In response, the prefetcher 106 issues prefetch requests for the addresses indicated by the next pointer values.

In some embodiments, the OS executing at the processor 100 can manage the values of the prefetch fields to enhance prefetching efficiency. For example the OS can apply thresholds to the prefetch to the statistics field for a row to identify which prefetch fields have triggered a threshold number of prefetch hits, and invalidate those sets of prefetch fields that do not meet the threshold. The OS can also store known (e.g., previously recorded) prefetch sequences at the sets of prefetch fields to enhance prefetch accuracy. In some embodiments, the OS can store sets of prefetch field values to another portion of memory in response to a system event such as a virtual machine context switch, and restore the stored prefetch field values in response to resuming execution of the virtual machine or other system event.

Figure 6:
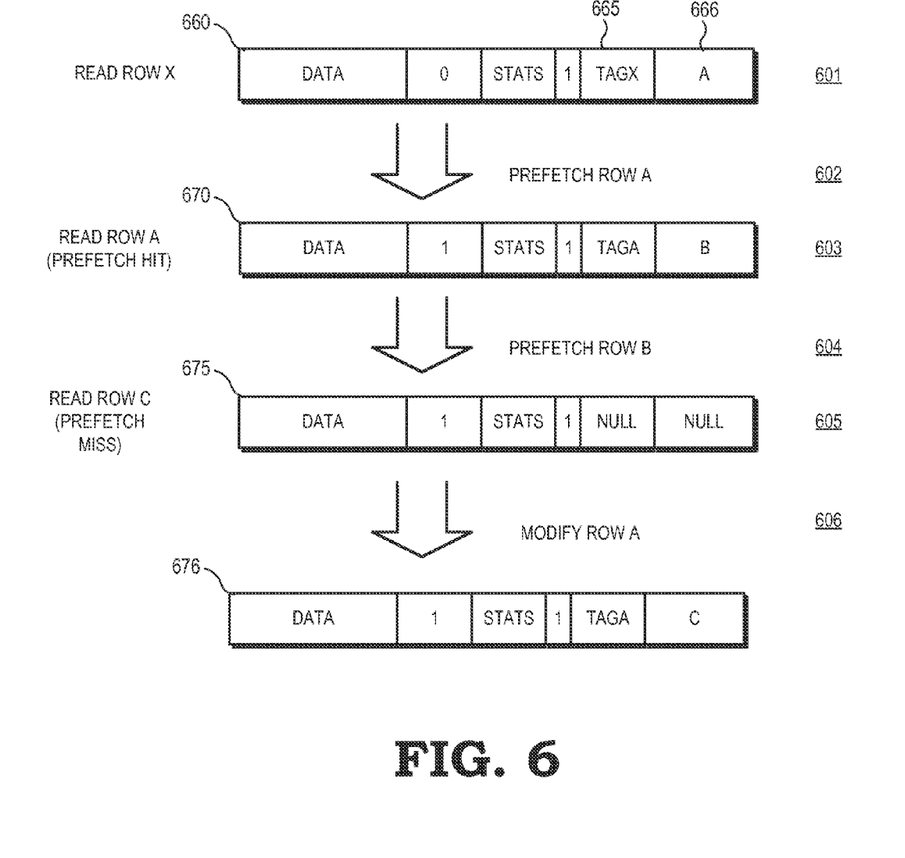
FIG. 6 is a block diagram illustrating modification of prefetch stream data stored at a memory module in accordance with some embodiments.

FIG. 6 illustrates an example use of the prefetch fields at the memory module 110 in accordance with some embodiments. At a time 601 the memory module 110 receives a read request for a row 660 designated, for purposes of description, as "ROW X". ROW X includes a tag field 665 storing a tag value that matches a portion of the address for ROW X and a next pointer field 666 that stores a pointer to a row 670, designated "ROW A". The memory module 110 identifies a match between the address of the read request and the tag value at tag field 665 and in response provides the pointer to ROW A to the prefetcher 106. In response to receiving the pointer the prefetcher 106 prefetches ROW A at time 602.

At time 603, a read request of ROW A is the next memory access request issued by the processor core 102. This condition is referred to as a prefetch hit. In response to the read request, the memory module 110 matches a tag value of the request to the tag field of ROW A, and in response provides the value at the next pointer field of row A, pointing to a row 675 (designated "ROW B") to the prefetcher 106, which prefetches ROW B at time 604. At time 605, a memory access request of a row 676, designated "ROW C", is the next memory access request issued by the processor core 102. This condition, wherein the next memory access request does not match the most recently prefetched row, is referred to as a "prefetch miss". A prefetch miss indicates that the prefetch stream indicated by the next pointer fields of the accessed rows differs from the pattern of memory accesses employed by the processor core 102. Accordingly, in order to improve the accuracy of the prefetch stream, the processor 100 updates the prefetch stream to match the pattern of memory accesses. To illustrate, at time 606, the memory module 110 modifies the next pointer field of row A to store a pointer pointing to ROW C, thereby matching the memory access issued by the processor core 102.

In some embodiments, the prefetch fields of a row are held open at the storage array 116 until it the prefetcher 106 or other module identifies whether a prefetch hit or miss for the next pointer values of the row is determined. This allows the next pointer fields at the row to be modified in the event of a prefetch miss without having to reopen the row. In some embodiments, the values of the prefetch fields for an accessed row are retrieved and temporarily stored at a metadata buffer (not shown) of the memory controller 104. This allows for prefetching based on recently accessed rows while allowing the rows to be closed, enhancing memory access efficiency. The memory controller 104 can also make modifications to the prefetch information at the metadata buffer, for example updating next pointer information in response to a prefetch miss. The memory controller can write-through changes to the prefetch information during, for example, idle memory access cycles.

Figure 7:
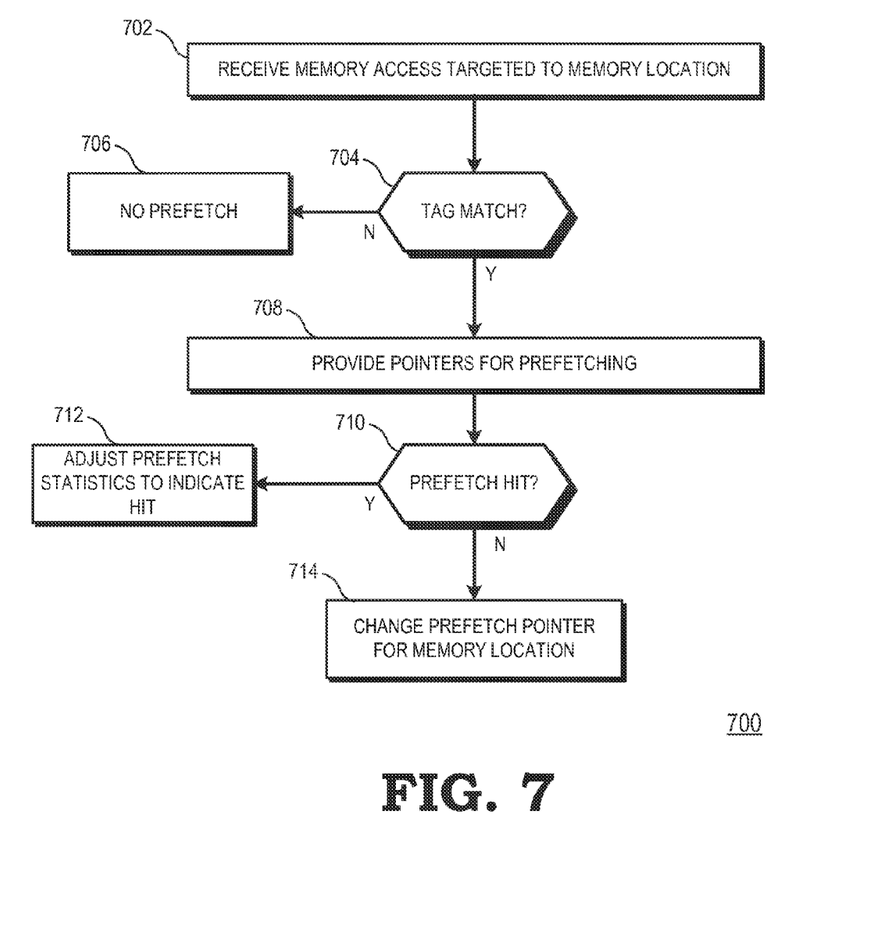
FIG. 7 is a flow diagram of a method of storing prefetch stream data at a memory module in accordance with some embodiments.

FIG. 7 illustrates a flow diagram of a method 700 of storing prefetch stream information at the memory module 110 of FIG. 1 in accordance with some embodiments. At block 702 the memory module 110 receives a memory access request targeted to a given row. At block 704, the memory module 110 identifies whether a tag value for the memory access request matches any of the tag fields of the row. If not, the method flow moves to block 706 and the prefetcher 106 does not perform any prefetching based on the memory access request.

If, at block 704, a tag value for the memory access request does match one or more of the tag fields of the row, the method flow moves to block 708 and the memory module 110 provides the next pointer fields corresponding to each matching tag field to the prefetcher 106, which prefetches the rows corresponding to the next pointer fields. At block 710, the memory module 110 identifies whether a prefetch hit has occurred. That is, the memory module 110 identifies whether the next memory access request, after the memory access request received at block 702, is targeted to one of the rows prefetched at block 708. If a prefetch hit occurs, the method flow moves to block 712 and the memory module 110 adjusts the prefetch statistics for the row targeted at block 702 to indicate the hit. If, at block 710, a prefetch miss occurs, the method flow moves to block 714 and the memory module 110 updates the next pointer fields of the row targeted at block 702 to reflect the row targeted by the memory access request that triggered the prefetch miss.

In some embodiments, the apparatus and techniques described above are implemented in a system comprising one or more integrated circuit (IC) devices (also referred to as integrated circuit packages or microchips), such as the processor described above with reference to FIGS. 1-7. Electronic design automation (EDA) and computer aided design (CAD) software tools may be used in the design and fabrication of these IC devices. These design tools typically are represented as one or more software programs. The one or more software programs comprise code executable by a computer system to manipulate the computer system to operate on code representative of circuitry of one or more IC devices so as to perform at least a portion of a process to design or adapt a manufacturing system to fabricate the circuitry. This code can include instructions, data, or a combination of instructions and data. The software instructions representing a design tool or fabrication tool typically are stored in a computer readable storage medium accessible to the computing system. Likewise, the code representative of one or more phases of the design or fabrication of an IC device may be stored in and accessed from the same computer readable storage medium or a different computer readable storage medium.

A computer readable storage medium may include any storage medium, or combination of storage media, accessible by a computer system during use to provide instructions and/or data to the computer system. Such storage media can include, but is not limited to, optical media (e.g., compact disc (CD), digital versatile disc (DVD), Blu-Ray disc), magnetic media (e.g., floppy disc, magnetic tape, or magnetic hard drive), volatile memory (e.g., random access memory (RAM) or cache), non-volatile memory (e.g., read-only memory (ROM) or Flash memory), or microelectromechanical systems (MEMS)-based storage media. The computer readable storage medium may be embedded in the computing system (e.g., system RAM or ROM), fixedly attached to the computing system (e.g., a magnetic hard drive), removably attached to the computing system (e.g., an optical disc or Universal Serial Bus (USB)-based Flash memory), or coupled to the computer system via a wired or wireless network (e.g., network accessible storage (NAS)).

In some embodiments, certain aspects of the techniques described above may implemented by one or more processors of a processing system executing software. The software comprises one or more sets of executable instructions stored or otherwise tangibly embodied on a non-transitory computer readable storage medium. The software can include the instructions and certain data that, when executed by the one or more processors, manipulate the one or more processors to perform one or more aspects of the techniques described above. The non-transitory computer readable storage medium can include, for example, a magnetic or optical disk storage device, solid state storage devices such as Flash memory, a cache, random access memory (RAM) or other non-volatile memory device or devices, and the like. The executable instructions stored on the non-transitory computer readable storage medium may be in source code, assembly language code, object code, or other instruction format that is interpreted or otherwise executable by one or more processors.

Note that not all of the activities or elements described above in the general description are required, that a portion of a specific activity or device may not be required, and that one or more further activities may be performed, or elements included, in addition to those described. Still further, the order in which activities are listed are not necessarily the order in which they are performed. Also, the concepts have been described with reference to specific embodiments. However, one of ordinary skill in the art appreciates that various modifications and changes can be made without departing from the scope of the present disclosure as set forth in the claims below. Accordingly, the specification and figures are to be regarded in an illustrative rather than a restrictive sense, and all such modifications are intended to be included within the scope of the present disclosure.

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims. Moreover, the particular embodiments disclosed above are illustrative only, as the disclosed subject matter may be modified and practiced in different but equivalent manners apparent to those skilled in the art having the benefit of the teachings herein. No limitations are intended to the details of construction or design herein shown, other than as described in the claims below. It is therefore evident that the particular embodiments disclosed above may be altered or modified and all such variations are considered within the scope of the disclosed subject matter. Accordingly, the protection sought herein is as set forth in the claims below.

What is claimed is:

1. A method comprising:
    receiving a first memory access request at a memory module associated with a processor, the first memory access request targeted to a first memory address corresponding to a first location of the memory module; and
    in response to the first memory access request, adjusting, at the memory module, first access metadata indicating a pattern of accesses to the first memory address of the memory module, wherein adjusting the first access metadata comprises:
        reading a value of the first access metadata from a storage array of the memory module;
        selecting, at the memory module, a first adjustment rule of a plurality of adjustment rules for the first access metadata;
        executing the first adjustment rule at the memory module to generate an adjusted value for the first access metadata; and
        storing the adjusted value at the storage array.

2. The method of claim 1, further comprising:
    prefetching data from the memory module to the processor based on the first access metadata.

3. The method of claim 1, further comprising:
    in response to receiving a second memory access request at the memory module, adjusting, at the memory module, second access metadata indicating a pattern of accesses to a second memory address corresponding to a second location of the memory module, the second location different from the first location.

4. The method of claim 3, wherein the second access metadata indicates access information of a different type than the first access metadata.

5. The method of claim 3, wherein adjusting the second access metadata comprises:
    reading a value of the second access metadata from the storage array;
    selecting, at the memory module, a second adjustment rule from the plurality of adjustment rules for the second access metadata, the second adjustment rule different from the first adjustment rule;
    executing the second adjustment rule at the memory module to generate an adjusted value for the second access metadata; and
    storing the adjusted value for the second access metadata at the storage array.

6. The method of claim 1, further comprising:
    receiving the first adjustment rule at the memory module from the processor; and
    configuring a control module of the memory module to execute the first adjustment rule.

7. The method of claim 1, wherein the first access metadata includes at least one of: a number of read accesses for the first location, a number of write accesses for the first location, a number of bit flips for the first location, an average read latency for the first location and an average write latency for the first location.

8. The method of claim 1, wherein the first access metadata includes prefetch data indicating a second memory location that was historically accessed after the first location.

9. A device, comprising:
    a memory module including:
        a first memory address corresponding to a first memory location to store data to be accessed by a processor;
        a first memory location to store first access metadata indicating a pattern of accesses to the first memory address;
        a control module to adjust the first access metadata by:
            reading a current value of the first access metadata;
            identifying a first adjustment rule for the first access metadata;
            generating an adjusted value for the first access metadata based on the first adjustment rule; and
            storing the adjusted value at the first memory location.

10. The device of claim 9, further comprising:
    a processor coupled to the memory module, the processor to prefetch data from the memory module based on the first access metadata.

11. The device of claim 9, wherein the memory module further includes:
    a second memory address corresponding to a second memory location to store data to be accessed by the processor; and
    a second memory location to store second access metadata indicating a pattern of accesses to the second memory location.

12. The device of claim 11, wherein the second access metadata indicates access information of a different type than the first access metadata.

13. The device of claim 12, wherein the control module is to adjust the second access metadata by:
    reading a current value of the second access metadata;
    identifying a second adjustment rule for the first access metadata, the second adjustment rule different from the first adjustment rule;

generating an adjusted value for the second access metadata based on the second adjustment rule; and storing the adjusted value for the second access metadata at the second memory location.

14. The device of claim 9, wherein the memory module is to:

receive the first adjustment rule from the processor.

* * * * *